United States Patent
Shi et al.

(10) Patent No.: US 10,731,706 B2
(45) Date of Patent: Aug. 4, 2020

(54) BOX TYPE SEALING STRUCTURE AND CONICAL ROLLER BEARING

(71) Applicant: Schaeffler Technologies AG & Co. KG, Herzogenaurach (DE)

(72) Inventors: Xiaoyi Shi, Suzhou (CN); Hongwei Song, Shanghai (CN); Zhiheng Liu, Shanghai (CN); Gilson Arima, Rochester Hills, MI (US); Uwe Niebling, Neustadt an der Aisch (DE); Fuqiang Cai, Shanghai (CN); Xin Liu, Shanghai (CN); Lijuan Wu, Suzhou (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/312,031

(22) PCT Filed: May 27, 2017

(86) PCT No.: PCT/CN2017/086400
§ 371 (c)(1),
(2) Date: Apr. 18, 2019

(87) PCT Pub. No.: WO2018/001026
PCT Pub. Date: Jan. 4, 2018

(65) Prior Publication Data
US 2019/0257361 A1   Aug. 22, 2019

(30) Foreign Application Priority Data
Jun. 17, 2016   (CN) .................... 2016 2 0652889 U

(51) Int. Cl.
*F16C 33/36* (2006.01)
*F16C 33/76* (2006.01)
*F16C 33/78* (2006.01)
*B61F 15/22* (2006.01)

(52) U.S. Cl.
CPC .......... *F16C 33/7803* (2013.01); *F16C 33/78* (2013.01); *F16C 33/7816* (2013.01); *B61F 15/22* (2013.01)

(58) Field of Classification Search
CPC ................ F16C 19/364; F16C 33/7813; F16C 33/7859; F16C 33/7863; F16C 33/7879; F16C 33/7883
See application file for complete search history.

(56) References Cited

U.S. PATENT DOCUMENTS

| | | | | |
|---|---|---|---|---|
| 4,770,424 A | * | 9/1988 | Otto ...................... | F16C 33/805 277/351 |
| 4,799,808 A | * | 1/1989 | Otto .................... | F16C 33/7876 277/349 |
| 5,553,870 A | | 9/1996 | Czekansky | |

(Continued)

FOREIGN PATENT DOCUMENTS

| | | |
|---|---|---|
| CN | 104053934 A | 9/2014 |
| CN | 204512420 U | 7/2015 |

(Continued)

*Primary Examiner* — Phillip A Johnson
(74) *Attorney, Agent, or Firm* — Kevin L. Parks

(57) ABSTRACT

A box type sealing structure including an oil throwing ring and sealing ring with a frame and sealing portion attached to the frame, the oil throwing ring including a centrifugal structure.

10 Claims, 4 Drawing Sheets

(56) References Cited

U.S. PATENT DOCUMENTS

| | | | | |
|---|---|---|---|---|
| 5,890,812 A | * | 4/1999 | Marcello | F16C 33/7813 384/148 |
| 8,596,872 B2 | * | 12/2013 | Pruden | F16C 33/7879 277/351 |
| 2011/0085755 A1 | * | 4/2011 | Pruden | F16C 33/7879 384/486 |
| 2016/0039246 A1 | | 2/2016 | Brunetti | |
| 2018/0216667 A1 | * | 8/2018 | Song | F16C 33/80 |

FOREIGN PATENT DOCUMENTS

| | | | | |
|---|---|---|---|---|
| CN | 205918768 U | | 2/2017 | |
| DE | 102006047016 A1 | | 4/2007 | |
| DE | 102015210017 A1 | * | 1/2016 | F16C 33/7823 |
| EP | 0942188 A2 | | 9/1999 | |

\* cited by examiner

BOX TYPE SEALING STRUCTURE AND CONICAL ROLLER BEARING

REFERENCE TO RELATED APPLICATIONS

The present application claims the priority of Chinese Utility Model Application No. 201620652889.6, titled "Box Type Sealing Structure and Conical Roller Bearing", and filed on Jun. 27, 2016, the content of which is all incorporated by reference into this application.

TECHNICAL FIELD

The present disclosure relates to the sealing field, and in particular relates to a box type sealing structure mainly used for bearing sealing in the railway field and a conical roller bearing using the box type sealing structure.

BACKGROUND

The conical roller bearing known in the art comprise two box type sealing structures arranged on the two axial sides. Each box type sealing structure is annular as a whole and is used to seal the oil medium (usually lubricating oil) in the bearing and prevent external foreign matters from entering the bearing.

FIG. 1 is a partial cutaway view of the box type sealing structure known in the art and shows a half of the axial cross-sectional structure of the box type sealing structure. The box type sealing structure (10) known in the art comprises an oil-throwing ring (101) used to fix to the inner ring of the bearing and a sealing ring used to fix to the outer ring of the bearing, the sealing ring comprises a frame (102) fixed to the outer ring and a sealing portion (103) attached to the frame (102), and the sealing portion (103) has a plurality of sealing lips (including a primary sealing lip (105) and a plurality of secondary sealing lips (106)) extending towards the oil-throwing ring (101).

As shown in FIG. 1, a bent portion (104) is provided on the axial inner side of the oil-throwing ring axial portion (101a) extending in the axial direction (A) of the oil-throwing ring (101), the bent portion (104) extends outwards in the radial direction (R), only a small clearance exists between the bent portion (104) and the sealing portion (103) in the axial direction (A), the size of the clearance in the axial direction (A) is constant, and thus it is difficult for the oil medium on the axial inner side of the box type sealing structure (10) to enter the box type sealing structure (10).

However, the inventor finds that the oil medium will inevitably go from the above-mentioned clearance into the box type sealing structure (10) in practical applications. Once the oil medium enters the box type sealing structure (10), the oil medium in the box type sealing structure (10) can only flow towards the axial outer side, but will not return to the inside of the bearing. In this way, the oil medium will inevitably leak out of the box type sealing structure (10). Thus, the box type sealing structure (10) of the prior art cannot satisfactorily seal the oil medium.

SUMMARY

The present disclosure provides a box type sealing structure which can improve the sealing effect on the oil medium and a conical roller bearing having the box type sealing structure.

The present disclosure provides the following box type sealing structure. Said box type sealing structure is annular as a whole, said box type sealing structure comprises an oil-throwing ring and a sealing ring, said sealing ring comprises a frame and a sealing portion attached to the frame, said oil-throwing ring has an oil-throwing ring axial portion extending in the axial direction, said oil-throwing ring additionally has a first centrifugal structure closer to the axial inner side than said oil-throwing ring axial portion, said first centrifugal structure has a first bent portion extending towards the axial inner side and the radial outer side, said sealing portion comprises a first sealing cover portion separated from said first bent portion and arranged on the radial outer side of said first bent portion, and said first sealing cover portion extends towards the axial inner side in the axial direction until it at least reaches a position which is flush with said first bent portion.

In one embodiment, the radial inner side of said first sealing cover portion extends in the axial direction.

In a further embodiment, a plurality of oil-pumping grooves opposite to said oil-throwing ring axial portion are provided for said sealing portion in the axial outer side position adjacent to said first sealing cover portion, said plurality of oil-pumping grooves are circumferentially arranged at intervals, the radial outer side of said oil-pumping groove is connected to the radial inner side of said first sealing cover portion, and the radial outer side of said oil-pumping groove extends from the radial inner side of said first sealing cover portion towards the axial outer side and the radial inner side.

In a further embodiment, said sealing portion additionally comprises a primary sealing lip and a plurality of secondary sealing lips on the axial outer side of said oil-pumping groove, and said primary sealing lip and said plurality of secondary sealing lips extend towards said oil-throwing ring.

In a further embodiment, said primary sealing lip is a contact sealing lip which contacts said oil-throwing ring, said primary sealing lip extends towards the axial outer side and the radial inner side, said plurality of secondary sealing lips are non-contact sealing lips, said plurality of secondary sealing lips comprise at least two labyrinth lips, said at least two labyrinth lips extending towards said oil-throwing axial portion in the radial direction and being located on the axial inner side of said primary sealing lip, a labyrinth groove denting towards the radial outer side being formed between two adjacent labyrinth lips of said at least two labyrinth lips; and a dustproof lip, said dustproof lip extending towards the axial outer side and the radial inner side, and said dustproof lip being located on the radial inner side of said primary sealing lip.

In an embodiment said oil-throwing ring additionally has an oil-throwing ring radial portion extending in the radial direction and a second centrifugal structure closer to the radial outer side than said oil-throwing ring radial portion, said second centrifugal structure has a second bent portion extending towards the axial outer side and the radial outer side, said sealing ring comprises a second sealing cover portion separated from said second bent portion and arranged on the radial outer side of said second bent portion, and said second sealing cover portion extends towards the axial inner side in the axial direction until it at least reaches a position which is flush with said second bent portion.

In a further embodiment, a clearance exists between said second bent portion and said second sealing cover portion, and said clearance gradually decreases from the axial inner side to the axial outer side.

In a further embodiment, said second centrifugal structure further has a third bent portion extending towards the axial outer side and the radial inner side, said third bent portion is located between said second bent portion and said oil-throwing ring radial portion and is connected to said second bent portion and said oil-throwing ring radial portion.

In another embodiment said frame has a frame radial portion, said frame radial portion comprises an axial portion and a folded portion, said axial portion extends towards the axial outer side in the axial direction, said folded portion extends from the radial outer side of said axial portion to the axial inner side and the radial inner side so that said axial portion and said folded portion form said second sealing cover portion, or said sealing portion comprises said second sealing cover portion.

The present disclosure additionally provides the following conical roller bearing. Said conical roller bearing comprises an inner ring and an outer ring which can rotate relative to each other, and the box type sealing structure as described in any of the above-mentioned technical solutions, the frame of the sealing ring of said box type sealing structure is fixed to said outer ring, and the oil-throwing ring of said box type sealing structure is fixed to said inner ring.

With the above-mentioned technical solutions adopted, the box type sealing structure in the present disclosure can improve the sealing effect of the box type sealing structure on an oil medium by increasing the oil medium pumping efficiency and preventing the oil medium from flowing into the box type sealing structure. The conical roller bearing using the box type sealing structure in the present disclosure can achieve the same effect.

DETAILED DESCRIPTION

Figure 1:
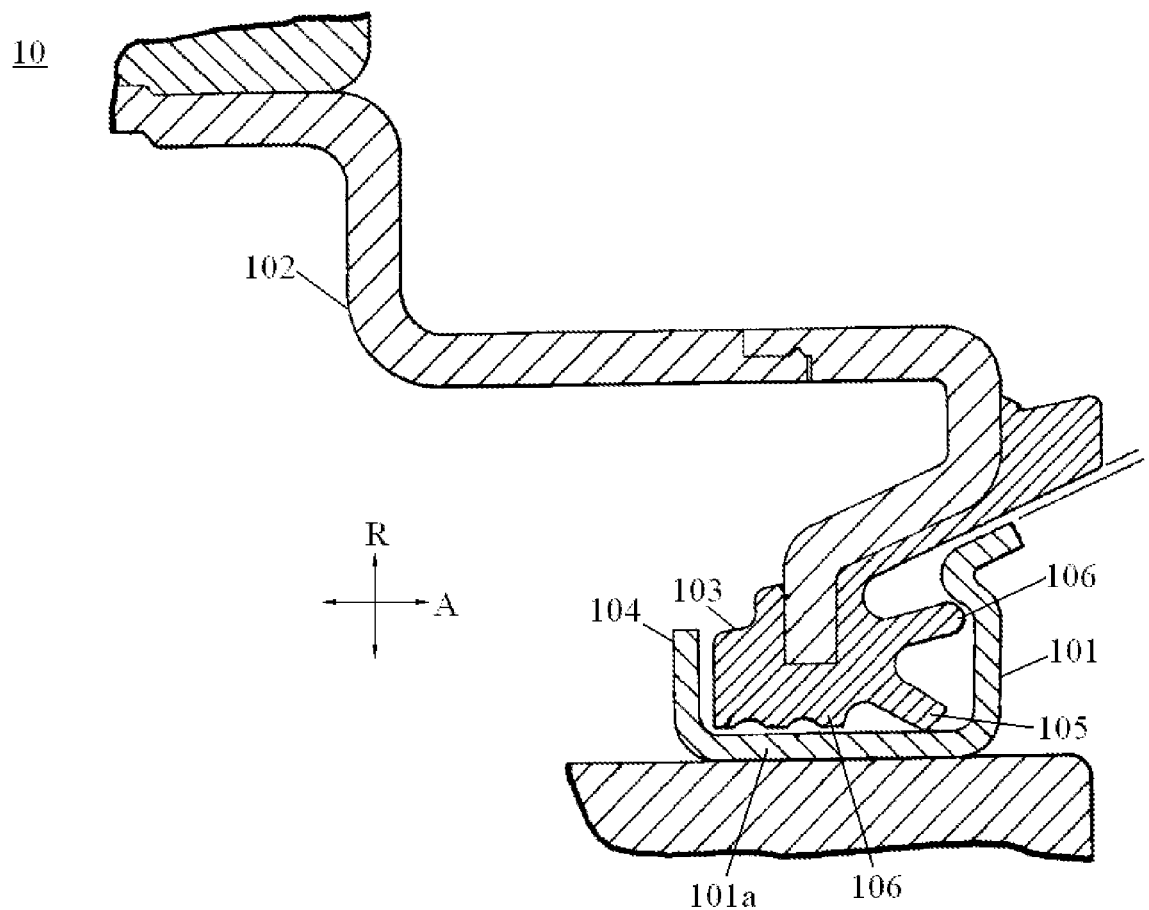
FIG. 1 is a partial cutaway view of the box type sealing structure known in the art and shows a half of the axial cross-sectional structure of the box type sealing structure.

The following will describe the specific embodiments of the present disclosure with reference to the drawings. In the drawings, the "axial direction" indicated by A is the direction of the central axis of the box type sealing structure, and the "radial direction" indicated by R is the radial direction of the box type sealing structure. In addition, in FIGS. 1 to 4, the right side is the axial outer side, the left side is the axial inner side, the upper side is the radial outer side, and the lower side is the radial inner side. For example, an oil medium such as lubricating oil is located on the axial inner side, and foreign matters such as dust are located on the axial outer side.

Figure 2:
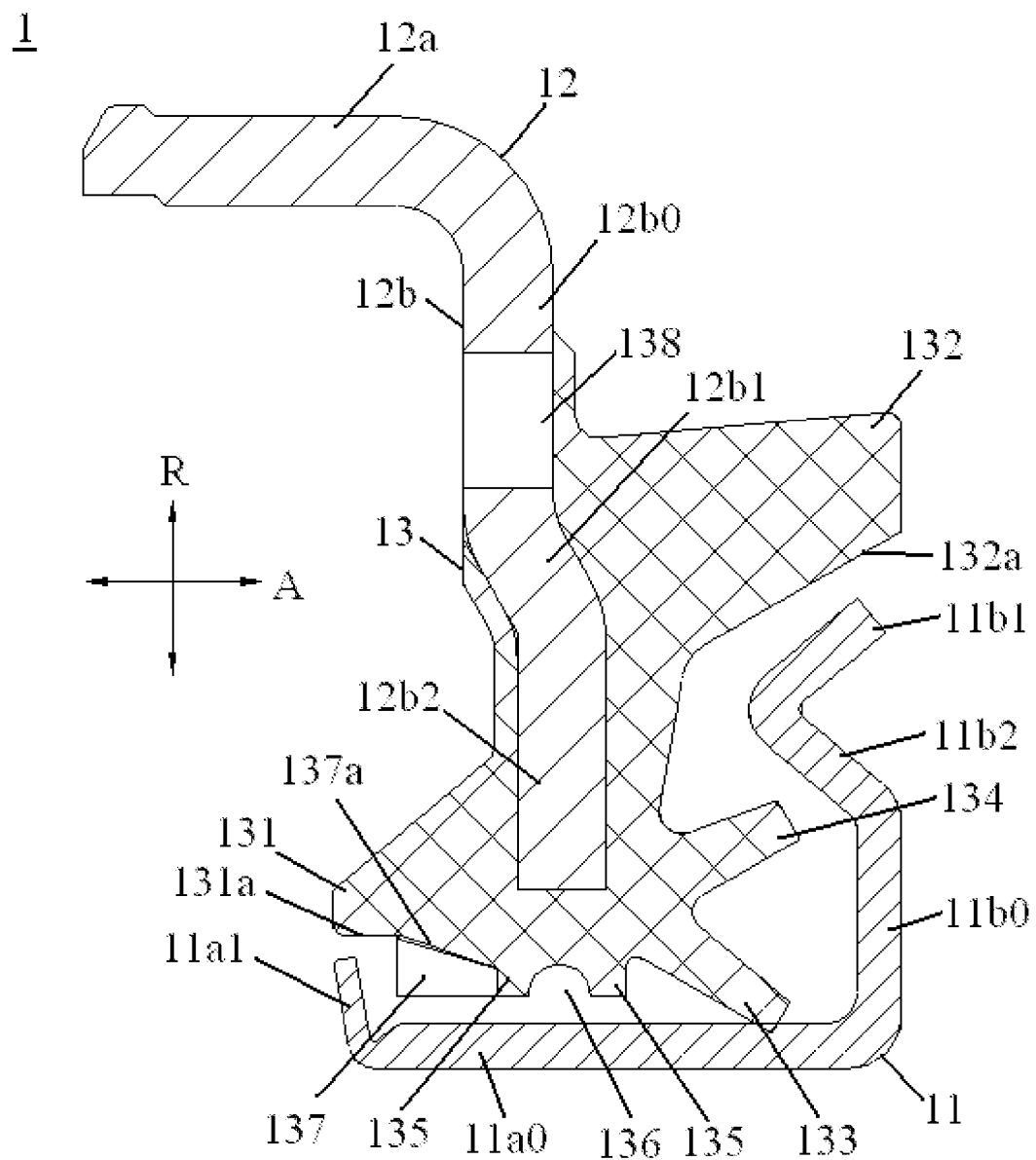
FIG. 2 is a partial cutaway view of the box type sealing structure of a first embodiment of the present disclosure and shows a half of the axial cross-sectional structure of the box type sealing structure.

As shown in FIG. 2, the box type sealing structure (1) of the first embodiment of the present disclosure is annular as a whole. The box type sealing structure (1) comprises an oil-throwing ring (11) used to fix to the inner ring of the bearing and a sealing ring used to fix to the outer ring of the bearing. The sealing ring comprises a frame (12) used to fix to the outer ring of the bearing and a sealing portion (13) attached to the frame (12). The oil-throwing ring (11) and the frame (12) are made of a hard material such as a metal, and the sealing portion (13) is made of an elastic material such as rubber.

The oil-throwing ring (11) has an oil-throwing ring axial portion ($11a0$) extending in the axial direction (A) and an oil-throwing ring radial portion ($11b0$) extending in the radial direction (R). In the present embodiment, the oil-throwing ring axial portion ($11a0$) is used to fix to the inner ring of the bearing.

The frame (12) has a frame axial portion ($12a$) extending the axial direction (A) and a frame radial portion ($12b$). In the present embodiment, the frame axial portion ($12a$) is used to fix to the outer ring of the bearing, and the sealing portion (13) is attached to the frame radial portion ($12b$). The frame radial portion ($12b$) comprises a first radial portion ($12b0$), a second radial portion ($12b2$), and a connecting portion ($12b1$) located between the first radial portion ($12b0$) and the second radial portion ($12b2$). Both the first radial portion ($12b0$) and the second radial portion ($12b2$) extend in the radial direction (R), the second radial portion ($12b2$) is located on the radial inner side of the first radial portion ($12b0$), the connecting portion ($12b1$) is connected to the first radial portion ($12b0$) and the second radial portion ($12b2$), and the connecting portion ($12b1$) extends towards the axial outer side and the radial inner side.

In the present embodiment, the oil-throwing ring (11) has a first centrifugal structure extending from the axial innermost end of the oil-throwing ring axial portion ($11a0$) and a second centrifugal structure extending from the radial outermost end of the oil-throwing ring radial portion ($11b0$). The first centrifugal structure is used to pump the oil medium entering the box type sealing structure (1) back to the inside of the bearing (namely, pump the oil medium to the axial inner side), and the second centrifugal structure is used to pump foreign matters entering the box type sealing structure (1) to the outside of the box type sealing structure (namely, pump foreign matters to the axial outer side).

The first centrifugal structure has a first bent portion ($11a1$) extending from the axial innermost end of the oil-throwing ring axial portion ($11a0$). The extension direction of the first bent portion ($11a1$) inclines to both the axial direction (A) and the radial direction (R), that is to say, the first bent portion ($11a1$) extends towards the axial inner side and the radial outer side. With the aid of the first bent portion ($11a1$) (the axial outer side), the oil medium flowing into the box type sealing structure (1) can easily be pumped along the first bent portion ($11a1$) to the axial inner side during the rotations of the oil-throwing ring (11) of the box type sealing structure (1) relative to the sealing ring. In this way, is the sealing effect of the box type sealing structure (1) on the oil medium is improved.

The second centrifugal structure has a third bent portion ($11b2$) and a second bent portion ($11b1$) which are sequentially connected from the radial outermost end of the oil-throwing ring radial portion ($11b0$). The extension directions of the third bent portion ($11b2$) and the second bent portion ($11b1$) both incline to the axial direction (A) and the radial direction (R). That is to say, the third bent portion ($11b2$) extends towards the axial inner side and the radial outer side, and the second bent portion ($11b1$) extends towards the axial outer side and the radial outer side. In this way, through the second bent portion ($11b1$) (the radial outer side), foreign matters can be pumped to the axial outer side to improve the sealing effect of the box type sealing structure (1) on foreign matters. In addition, the setting of the third bent portion (11*b*2) can prevent the second centrifugal structure from extending into the axial outer side of the oil-throwing ring radial portion (11*b*0), and thus the compactness of the whole box type sealing structure (1) can be guaranteed.

In the present embodiment, the sealing portion (13) comprises a first sealing cover portion (131) and a second sealing cover portion (132). The first sealing cover portion (131) is used to cover the first centrifugal structure (first bent portion (11*a*1)) from the radial outer side to guarantee that it is difficult for the oil medium in the bearing to enter the box type sealing structure (1) through the clearance between the first sealing cover portion (131) and the first centrifugal structure. In this way, the sealing effect of the box type sealing structure (1) on the oil medium is further improved. The second sealing cover portion (132) is used to cover the second centrifugal structure (second bent portion (11*b*1) and third bent portion (11*b*2)) from the radial outer side to guarantee that it is difficult for foreign matters on the axial outer side to enter the box type sealing structure (1) through the clearance between the second sealing cover portion (132) and the second centrifugal structure. In this way, the sealing effect of the box type sealing structure (1) on foreign matters is further improved.

That is to say, the first sealing cover portion (131) is kept on the radial outer side of the first centrifugal structure and extends towards the axial inner side in the axial direction (A) until it at least reaches a position which is flush with the first centrifugal structure, and the second sealing cover portion (132) is kept on the radial outer side of the second centrifugal structure and extends towards the axial outer side in the axial direction (A) until it at least reaches a position which is flush with said second centrifugal structure. Preferably, the clearance between the first sealing cover portion (131) and the first centrifugal structure and the clearance between the second sealing cover portion (132) and the second centrifugal structure are as small as possible. In this way, the objective of preventing foreign matters and the oil medium from entering the box type sealing structure (1) can be achieved better. The following structures can be formed: The radial inner side (131*a*) of the first sealing cover portion (131) extends in the axial direction (A) (roughly in parallel to the axial direction (A)) to guarantee that the clearance between the first sealing cover portion (131) (radial inner side (131*a*)) and the first centrifugal structure is small enough; the clearance between the second sealing cover portion (132) (radial inner side (132*a*)) and the second bent portion (11*b*1) (radial outer side) gradually decreases from the axial inner side to the axial outer side, that is to say, the clearance becomes smaller and smaller from the axial inner side to the axial outer side.

In addition, in order to improve the oil medium pumping efficiency, in the present embodiment, a plurality of oil-pumping grooves (137) opposite to the oil-throwing ring axial portion (11*a*0) are provided for the sealing portion (13) in the axial outer side position adjacent to the first sealing cover portion (131), the plurality of oil-pumping grooves (137) are circumferentially arranged at intervals, the radial outer side (137*a*) of the oil-pumping groove (137) is connected to the radial inner side (131*a*) of the first sealing cover portion (131) and extends from the radial inner side (131*a*) of the first sealing cover portion (131) towards the axial outer side and the radial inner side. In this way, even if the oil medium goes from the clearance between the first sealing cover portion (131) and the first centrifugal structure into the box type sealing structure (1), one part of the oil medium can be pumped to the axial inner side through the first centrifugal structure, and the other part of the oil medium can be pumped along the radial outer side (137*a*) of the oil-pumping groove (137) to the axial inner side under the action of the centrifugal force during the rotations of the oil-throwing ring (11) relative to the sealing ring. Thus, the oil medium pumping efficiency of the box type sealing structure (1) is enhanced, and the sealing effect of the box type sealing structure (1) on the oil medium is further improved. In order to reduce the size of the box type sealing structure (1) in the axial direction (A), oil-pumping grooves (137) are located on the axial inner side of the second radial portion (12*b*2) of the frame radial portion (12*b*).

In the present embodiment, the sealing portion (13) additionally comprises a primary sealing lip (133) extending towards the oil-throwing ring axial portion (11*a*0) and a plurality of secondary sealing lips. The plurality of secondary sealing lips comprise a dustproof lip (134) extending towards the third bent portion (11*b*2) and two labyrinth lips (135) extending towards the oil-throwing ring axial portion (11*a*0).

In the present embodiment, the primary sealing lip (133) is located on the radial inner side of the second sealing cover portion (132), the primary sealing lip (133) extends towards the axial outer side and the radial inner side, and the primary sealing lip (133) is preferably a contact sealing lip which contacts the oil-throwing ring axial portion (11*a*0). The primary sealing lip (133) is used to separate the oil medium from foreign matters in the box type sealing structure (1).

In the present embodiment, in the radial direction (R), the dustproof lip (134) is located between the second sealing cover portion (132) and the primary sealing lip (133), that is to say, the dustproof lip (134) is located on the radial inner side of the second sealing cover portion (132) and on the radial outer side of the primary sealing lip (133). The dustproof lip (134) extends towards the axial outer side and the radial outer side, and the dustproof lip (134) is preferably a non-contact sealing lip. In this way, the dustproof lip (134) can hold foreign matters entering the box type sealing structure (1) within a certain period of time, and then the foreign matters can be discharged from the clearance between the second centrifugal structure and the radial inner side (132*a*) of the second sealing cover portion (132). In addition, the space surrounded by the second sealing cover portion (132), the second bent portion (11*b*1), the third bent portion (11*b*2), and the dustproof lip (134) form a bent passage and the total length of the passage is large, which further prevents foreign matters from entering the box type sealing structure.

In the present embodiment, in the axial direction (A), two labyrinth lips (135) are located between the primary sealing lip (133) and the oil-pumping grooves (137), that is to say, the two labyrinth lips (135) are located on the axial inner side of the primary sealing lip (133) and on the axial outer side of the oil-pumping grooves (137), and the two labyrinth lips (135) extend towards the oil-throwing ring axial portion (11*a*0) in the radial direction. A labyrinth groove (136) denting towards the radial outer side is formed between two adjacent labyrinth lips (135); and a dustproof lip, the space between two labyrinth lips (135) and the oil-throwing ring axial portion (11*a*0) and the space between the labyrinth groove (136) and the oil-throwing ring axial portion (11*a*0) form a labyrinth structure (a structure which makes the space required for the oil medium to flow through from the axial outer side increase and then decrease) to prevent the oil medium from flowing to the axial outer side in the box type sealing structure (1).

In addition, in the present embodiment, a plurality of removal holes (138) (for example, elliptical removal holes) are circumferentially arranged at intervals on the frame radial portion (12b), and the box type sealing structure (1) can conveniently be removed through the removal holes (138).

In the present embodiment, the box type sealing structure (1) guarantees a high sealing performance for the oil medium by adopting centrifugal sealing, pumping sealing, labyrinth sealing, clearance sealing, and sealing of sealing lips.

Figure 3:
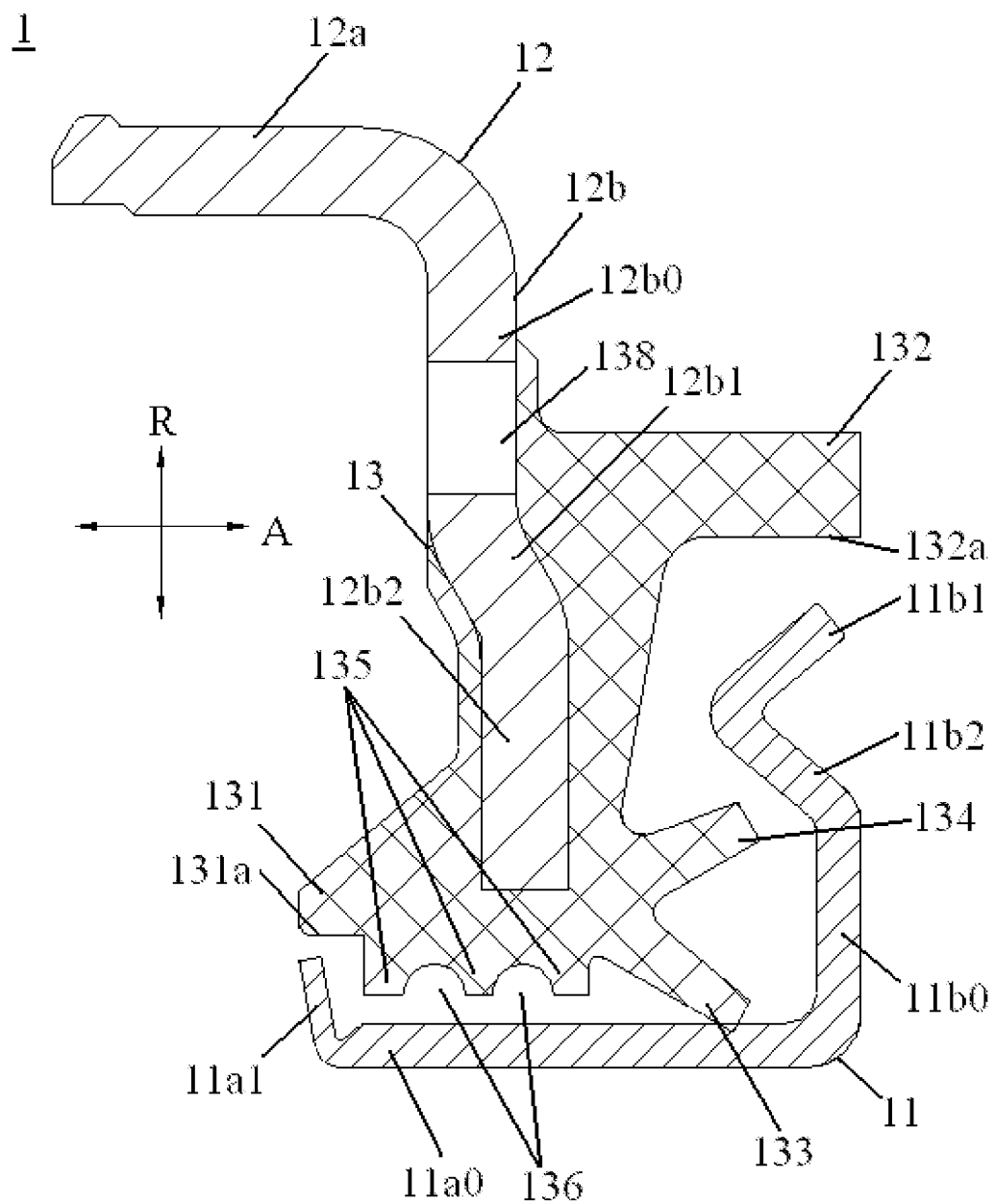
FIG. 3 is a partial cutaway view of the box type sealing structure of a second embodiment of the present disclosure and shows a half of the axial cross-sectional structure of the box type sealing structure.

As shown in FIG. 3, the structure of the second embodiment of the present disclosure is similar to the structure of the first embodiment of the present disclosure, and the difference between them is that in the second embodiment, no oil-pumping groove (137) is provided, but three labyrinth lips (135) and two labyrinth grooves (136) are provided (to form strengthened labyrinth sealing), and the radial inner side of the second sealing cover portion (132) extends in the axial direction.

Firstly, the three labyrinth lips (135) and the two labyrinth grooves (136) enable the space between the three labyrinth lips (135) and the oil-throwing ring axial portion (11a0) and the space between the two labyrinth grooves (136) and the oil-throwing ring axial portion (11a0) to form a strengthened structure. The strengthened labyrinth structure can better prevent the oil medium from flowing towards the axial outer side, and thus oil-pumping grooves (137) do not need to be provided as in the first embodiment.

Secondly, since the second sealing portion (132), the second bent portion (11b1), the third bent portion (11b2), and the dustproof lip (134) form a long bent passage and foreign matters can be discharged before they enter the box type sealing structure (1), the radial inner side of the second sealing cover portion (132) is not formed as in the first embodiment.

In the present embodiment, the box type sealing structure (1) guarantees a high sealing performance for the oil medium by adopting centrifugal sealing, strengthened labyrinth sealing, clearance sealing, and sealing of sealing lips.

Figure 4:
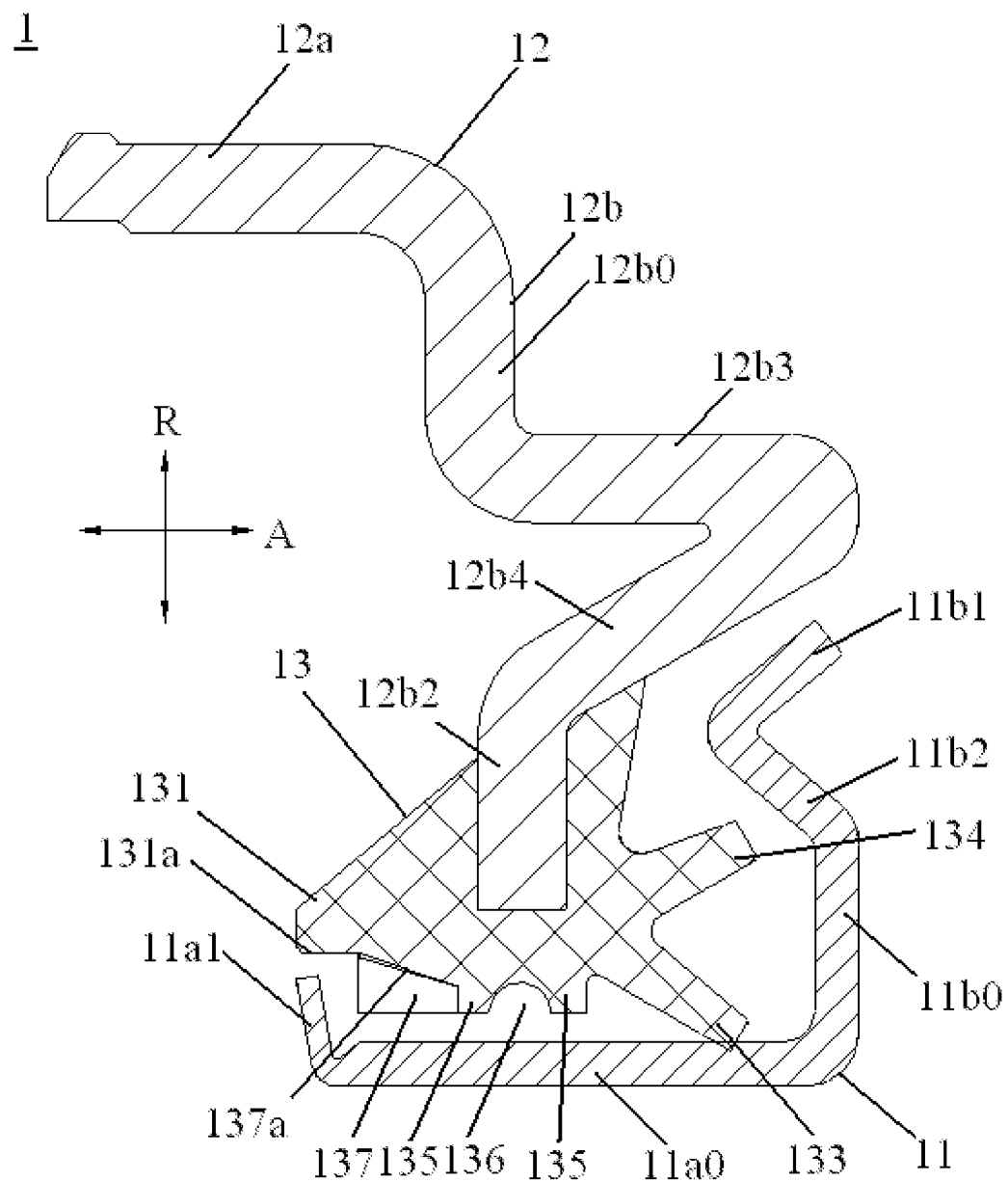
FIG. 4 is a partial cutaway view of the box type sealing structure of a third embodiment of the present disclosure and shows a half of the axial cross-sectional structure of the box type sealing structure.

As shown in FIG. 4, the structure of the third embodiment of the present disclosure is similar to the structure of the first embodiment of the present disclosure, and the difference between them is that in the third embodiment, the frame radial portion (12b) forms a bent structure which is bent towards the second centrifugal structure, and the bent structure forms a structure which is the same as the second sealing cover portion (132) of the first embodiment.

In an adverse environment, for example, on a desert, where foreign matters heavily enter the box type sealing structure (1), the service life of the second sealing cover portion (132) made of rubber is possibly very short. Thus the second sealing cover portion is made of the bent structure shown in FIG. 4 and formed by use of a part of the frame radial portion (12b) made of a metal to greatly prolong the service life of the second sealing cover portion.

Particularly, the frame radial portion (12b) comprises a first radial portion (12b0), a second radial portion (12b2), an axial portion (12b3), and a folded portion (12b4). Both the first radial portion (12b0) and the second radial portion (12b2) extend in the radial direction (R), and the second radial portion (12b2) is located on the radial inner side of the first radial portion (12b0). One end of the axial portion (12b3) is connected to the first radial portion (12b0) and the axial portion (12b3) extends towards the axial outer side in the axial direction (A), the folded portion (12b4) extends from the other end of the axial portion (12b3) towards the axial inner side and the radial inner side, and the folded portion (12b4) is connected to the second radial portion (12b2). In this way, the axial portion (12b3) and the folded portion (12b4) can form a structure like the second sealing cover portion (132) in the first embodiment.

In the present embodiment, the box type sealing structure (1) guarantees a high sealing performance for the oil medium by adopting centrifugal sealing, pumping sealing, labyrinth sealing, clearance sealing, and sealing of sealing lips.

Through the above-mentioned embodiments, the technical solutions of the box type sealing structure (1) of the present disclosure have been described in detail. In addition, the present disclosure additionally provides a conical roller bearing using the above-mentioned box type sealing structure (1). The conical roller bearing comprises an inner ring and an outer ring which can rotate relative to each other, the frame (12) (frame axial portion (12a)) of the sealing ring of the box type sealing structure (1) is fixed to the outer ring, and the oil-throwing ring (11) (oil-throwing ring axial portion (11a0)) of the box type sealing structure (1) is fixed to the inner ring.

Although specific embodiments of the present disclosure are described in detail above, it should be noted that:

1. The box type sealing structure (1) of the present disclosure can be used not only for conical roller bearings in the railway field, but also for other types of bearings in other fields, or can even be used for sealing between two assemblies which need to be sealed and can rotate relative to each other.

2. The types and quantities of the primary sealing lips (133) and the dustproof lips (134) are not limited to those in the above-mentioned embodiments, and the types and quantities of the primary sealing lip (133) and the dustproof lips (134) can be determined as required.

3. If the width of the box type sealing structure (1) in the axial direction (A) is not considered, the above-mentioned second centrifugal structure can be made to have only the second bent portion (11b1), but no third bent portion (11b2).

With the above-mentioned technical solutions, the present disclosure provides a box type sealing structure which improves the sealing effect on the oil medium and prevents foreign matters. In addition, the box type sealing structure is compact in the axial direction.

The scope of protection pertaining to the present disclosure is not limited to the above-mentioned embodiments and shall encompass any combinations of technical characteristics which satisfy the claims of the present disclosure.

DESCRIPTION OF REFERENCE NUMBERS IN THE ATTACHED DRAWINGS

10. Box type sealing structure
101. Oil-throwing ring
101a. Oil-throwing ring axial portion
102. Frame
103. Sealing portion
104. Bent portion
105. Primary sealing lip
106. Secondary sealing lip
1. Box type sealing structure
11. Oil-throwing ring
11a0. Oil-throwing ring axial portion
11a1. First bent portion
11b0. Oil-throwing ring radial portion
11b1. Second bent portion
11b2. Third bent portion 12. Frame
12a. Frame axial portion
12b. Frame radial portion
12b0. First radial portion
12b1. Connecting portion
12b2. Second radial portion
12b3. Axial portion
12b4. Folded portion
13. Sealing portion
131. First sealing cover portion
131a. Radial inner side
132. Second sealing cover portion
132a. Radial inner side
133. Primary sealing lip
134. Dustproof lip
135. Labyrinth lip
136. Labyrinth groove
137. Oil-pumping groove
137a. Radial outer side
138. Removal hole
R. Radial direction
A. Axial direction

The invention claimed is:

1. A box type sealing structure comprising:
an oil-throwing ring having an axial portion extending in an axial direction; and,
a sealing ring, including a frame and a sealing portion attached to the frame,
wherein the oil-throwing ring additionally has a first centrifugal structure closer to an axial inner side than the oil-throwing ring axial portion, the first centrifugal structure has a first bent portion extending towards the axial inner side and a radial outer side,
the sealing portion comprises a first sealing cover portion separated from the first bent portion and arranged on the radial outer side of the first bent portion, and the first sealing cover portion extends towards the axial inner side in the axial direction until it at least reaches a position which is flush with the first bent portion, and
a radial inner side of the first sealing cover portion extends in the axial direction, the box type sealing structure further comprising a plurality of oil-pumping grooves opposite the oil-throwing ring axial portion for the sealing portion in an axial outer side position adjacent to the first sealing cover portion, the plurality of oil-pumping grooves are circumferentially arranged at intervals, and
the radial outer side of the oil-pumping groove is connected to the radial inner side of the first sealing cover portion, and the radial outer side of the oil-pumping groove extends from the radial inner side of the first sealing cover portion towards the axial outer side and the radial inner side.

2. The box type sealing structure of claim 1, wherein the sealing portion further comprises a primary sealing lip and a plurality of secondary sealing lips on the axial outer side of the oil-pumping groove, and the primary sealing lip and the plurality of secondary sealing lips extend towards the oil-throwing ring.

3. The box type sealing structure of claim 2, wherein
the primary sealing lip is a contact sealing lip which contacts the oil-throwing ring, the primary sealing lip extends towards the axial outer side and the radial inner side,
the plurality of secondary sealing lips are non-contact sealing lips, the plurality of secondary sealing lips comprise at least two labyrinth lips, the at least two labyrinth lips extending towards the oil-throwing axial portion in the radial direction and located on the axial inner side of the primary sealing lip, a labyrinth groove recessed towards the radial outer side formed between two adjacent labyrinth lips of the at least two labyrinth lips; and a dustproof lip, the dustproof lip extending towards the axial outer side and the radial inner side, and the dustproof lip located on the radial inner side of the primary sealing lip.

4. A box type sealing structure comprising:
an oil-throwing ring having an axial portion extending in an axial direction; and,
a sealing ring, including a frame and a sealing portion attached to the frame,
wherein the oil-throwing ring additionally has a first centrifugal structure closer to an axial inner side than the oil-throwing ring axial portion, the first centrifugal structure has a first bent portion extending towards the axial inner side and a radial outer side,
the sealing portion comprises a first sealing cover portion separated from the first bent portion and arranged on the radial outer side of the first bent portion, and the first sealing cover portion extends towards the axial inner side in the axial direction until it at least reaches a position which is flush with the first bent portion; and
the oil-throwing ring additionally has an oil-throwing ring radial portion extending in the radial direction and a second centrifugal structure closer to the radial outer side than the oil-throwing ring radial portion, the second centrifugal structure has a second bent portion extending towards an axial outer side and the radial outer side, and
the sealing ring comprises a second sealing cover portion separated from the second bent portion and arranged on the radial outer side of the second bent portion, and the second sealing cover portion extends towards the axial inner side in the axial direction until it at least reaches a position which is flush with the second bent portion.

5. The box type sealing structure of claim 4, wherein a clearance exists between the second bent portion and the second sealing cover portion, and the clearance gradually decreases from the axial inner side to the axial outer side.

6. The box type sealing structure of claim 4, wherein the second centrifugal structure additionally has a third bent portion extending towards the axial outer side and the radial inner side, the third bent portion is located between the second bent portion and the oil-throwing ring radial portion and is connected to the second bent portion and the oil-throwing ring radial portion.

7. The box type sealing structure of claim 4, wherein the frame has a frame radial portion, the frame radial portion comprises an axial portion and a folded portion, the axial portion extends towards the axial outer side in the axial direction, the folded portion extends from the radial outer side of the axial portion to the axial inner side and the radial inner side so that the axial portion and the folded portion form the second sealing cover portion, or the sealing portion comprises the second sealing cover portion.

8. A conical roller bearing, comprising an inner ring and an outer ring which can rotate relative to each other; and
a box type sealing structure including an oil-throwing ring having an axial portion extending in an axial direction, and, a sealing ring, including a frame and a sealing portion attached to the frame, wherein the frame of the sealing ring of the box type sealing structure is fixed to the outer ring, and the oil-throwing ring of the box type sealing structure is fixed to the inner ring the oil-throwing ring additionally has a first centrifugal structure closer to an axial inner side than the oil-throwing ring axial portion, the first centrifugal structure has a first bent portion extending towards the axial inner side and a radial outer side, the sealing portion comprises a first sealing cover portion separated from the first bent portion and arranged on the radial outer side of the first bent portion, and the first sealing cover portion extends towards the axial inner side in the axial direction until it at least reaches a position which is flush with the first bent portion, the radial inner side of the first sealing cover portion extends in the axial direction, the box type sealing structure further comprising a plurality of oil-pumping grooves opposite the oil-throwing ring axial portion for the sealing portion in an axial outer side position adjacent to the first sealing cover portion, the plurality of oil-pumping grooves are circumferentially arranged at intervals, and the radial outer side of the oil-pumping groove is connected to the radial inner side of the first sealing cover portion, and the radial outer side of the oil-pumping groove extends from the radial inner side of the first sealing cover portion towards the axial outer side and the radial inner side.

9. The conical roller bearing of claim 8, wherein the sealing portion further comprises a primary sealing lip and a plurality of secondary sealing lips on the axial outer side of the oil-pumping groove, and the primary sealing lip and the plurality of secondary sealing lips extend towards the oil-throwing ring.

10. The conical roller bearing of claim 9, wherein, the primary sealing lip is a contact sealing lip which contacts the oil-throwing ring, the primary sealing lip extends towards the axial outer side and the radial inner side, the plurality of secondary sealing lips are non-contact sealing lips, the plurality of secondary sealing lips comprise at least two labyrinth lips, the at least two labyrinth lips extending towards the oil-throwing axial portion in the radial direction and located on the axial inner side of the primary sealing lip, a labyrinth groove recessed towards the radial outer side formed between two adjacent labyrinth lips of the at least two labyrinth lips; and a dustproof lip, the dustproof lip extending towards the axial outer side and the radial inner side, and the dustproof lip located on the radial inner side of the primary sealing lip.

* * * * *